(12) United States Patent
Ishimasa

(10) Patent No.: US 8,238,737 B2
(45) Date of Patent: Aug. 7, 2012

(54) LENS BARREL THAT CHANGES FOCAL LENGTH AND IMAGE PICKUP APPARATUS EQUIPPED WITH LENS BARREL

(75) Inventor: Toru Ishimasa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 12/797,995

(22) Filed: Jun. 10, 2010

(65) Prior Publication Data

US 2010/0322609 A1    Dec. 23, 2010

(30) Foreign Application Priority Data

Jun. 22, 2009   (JP) ................................ 2009-147579

(51) Int. Cl.
*G03B 17/00*    (2006.01)
(52) U.S. Cl. .......................................... 396/72; 396/349
(58) Field of Classification Search .................... 396/72, 396/349
See application file for complete search history.

(56) References Cited

U.S. PATENT DOCUMENTS

| | | | |
|---|---|---|---|
| 6,835,006 B2 | 12/2004 | Tanaka et al. | |
| 8,014,660 B2 * | 9/2011 | Nomura | 396/72 |
| 8,059,953 B2 * | 11/2011 | Nomura | 396/63 |
| 2003/0219243 A1 * | 11/2003 | Tanaka et al. | 396/72 |
| 2006/0067671 A1 * | 3/2006 | Nagae | 396/349 |
| 2010/0165488 A1 * | 7/2010 | Ishimasa | 359/740 |
| 2010/0310243 A1 * | 12/2010 | Nomura | 396/63 |
| 2010/0322609 A1 * | 12/2010 | Ishimasa | 396/72 |

FOREIGN PATENT DOCUMENTS

| | | |
|---|---|---|
| CN | 1952714 A | 4/2007 |
| JP | 10-111444 | 4/1998 |
| JP | 2004-347615 | 12/2004 |

OTHER PUBLICATIONS

The above reference was cited in a Aug. 25, 2011 Chinese Office Action, which is enclosed with an English Translation, that issued in Chinese Patent Application No. 201010206142.5.

* cited by examiner

*Primary Examiner* — W. B. Perkey
(74) *Attorney, Agent, or Firm* — Cowan, Liebowitz & Latman, P.C.

(57) ABSTRACT

A lens barrel that is capable of decreasing a barrel length under a retracted condition by simplifying a configuration. The lens barrel changes a focal length by moving first and second lens groups in an optical axis direction. A light-amount adjusting member is located between the first and second lens groups. First, second, third holding frames hold the first lens group, the second lens group, and the light-amount adjusting member, respectively. A cam mechanism moves the first, second, and third holding frames in the optical axis direction so that a part of the second lens group is inserted into the aperture of the light-amount adjusting member and concave and convex surfaces of the first and second lens groups are overlapped in the optical axis direction under a retracted condition. The aperture diameter of the light-amount adjusting member is enlarged when shifting to the retracted condition from a shooting condition.

2 Claims, 16 Drawing Sheets

LENS BARREL THAT CHANGES FOCAL LENGTH AND IMAGE PICKUP APPARATUS EQUIPPED WITH LENS BARREL

BACKGROUND OF THE INVENTION

1. Field of the Invention

The present invention relates to a lens barrel that changes a focal length, increases a barrel length under a shooting condition, and decreases the barrel length under a retracted condition, and to an image pickup apparatus equipped with the lens barrel.

2. Description of the Related Art

Conventionally, various techniques to shorten the barrel length under the retracted condition have been suggested with respect to a zoom lens barrel that increases the barrel length under the shooting condition and decreases the barrel length under the retracted condition to retract the lens barrel into a camera body (a retractable lens).

Japanese Laid-Open Patent Publication (Kokai) No. 2004-347615 (JP2004-347615A) discloses a lens barrel that can further decrease a length in an optical axis direction (the barrel length) as compared with an ordinary retractable lens barrel that can extend and can be retracted into a camera body, and a camera equipped with such a lens barrel. FIG. 17 is a sectional view showing a configuration of the conventional lens barrel described in the above-mentioned publication. This lens barrel 800 is capable of varying its barrel length between a retracted condition with a short barrel length and a shooting condition with a long barrel length. The lens barrel 800 reduces a length in an optical axis direction by opening an aperture of a lens shutter 900 and inserting a lens group 852 into the aperture under the retracted condition.

Moreover, Japanese Laid-Open Patent Publication (Kokai) No. H10-111444 (JP H10-111444A) discloses a zoom lens barrel with a shutter that is able to shorten a length in an optical axis direction under the retracted condition.

However, the above-mentioned conventional lens barrel has a problem that the barrel length under the retracted condition cannot be shortened enough.

Moreover, the lens barrel in the Japanese Laid-Open Patent Publication (Kokai) No. 2004-347615 (JP 2004-347615A) has a configuration where a light-amount control member such as a lens shutter is opened compulsorily more greatly than the maximum aperture at the time of shooting by a rodlike member, when the lens barrel shifts to the retracted condition from the shooting condition. Accordingly, unnecessary power is applied to the light-amount control member, which may break the light-amount control member.

SUMMARY OF THE INVENTION

The present invention provides a lens barrel and an image pickup apparatus with the lens barrel that are capable of decreasing a barrel length under the retracted condition by simplifying a configuration. Moreover, the present invention provides a lens barrel and an image pickup apparatus that are capable of preventing a breakage of the light-amount adjusting member.

Accordingly, a first aspect of the present invention provides a lens barrel that changes a focal length by moving at least one of a first lens group and a second lens group in an optical axis direction, and that increases a barrel length under a shooting condition and decreases the barrel length under a retracted condition, comprising a first holding frame adapted to hold the first lens group, a second holding frame adapted to hold the second lens group, a light-amount adjusting member adapted to adjust an amount of light that transmits an optical system by changing a diameter of an aperture, the light-amount adjusting member being located between the first lens group and the second lens group, a third holding frame adapted to hold the light-amount adjusting member, and a cam mechanism adapted to move the first, second, and third holding frames in the optical axis direction so that a part of the second lens group is inserted into the aperture of the light-amount adjusting member and concave and convex surfaces, which are faced to each other, of the first and second lens groups are overlapped in the optical axis direction under the retracted condition, wherein the diameter of the aperture of the light-amount adjusting member is enlarged and the first, second, and third holding frames are moved in the optical axis direction, when shifting to the retracted condition from the shooting condition.

Accordingly, a second aspect of the present invention provides an image pickup apparatus comprising, a lens barrel adapted to change a focal length by moving at least one of a first lens group and a second lens group in an optical axis direction, to increase a barrel length under a shooting condition, and to decrease the barrel length under a retracted condition, comprising a first holding frame adapted to hold the first lens group, a second holding frame adapted to hold the second lens group, a light-amount adjusting member adapted to adjust an amount of light that transmits an optical system by changing a diameter of an aperture, the light-amount adjusting member being located between the first lens group and the second lens group, a third holding frame adapted to hold the light-amount adjusting member, and a cam mechanism adapted to move the first, second, and third holding frames in the optical axis direction so that a part of the second lens group is inserted into the aperture of the light-amount adjusting member and concave and convex surfaces, which are faced to each other, of the first and second lens groups are overlapped in the optical axis direction under the retracted condition, a control unit adapted to control the light-amount adjusting member so as to enlarge the diameter of the aperture and to control the cam mechanism so as to move the first, second, and third holding frames in the optical axis direction, when shifting to the retracted condition from the shooting condition.

According to the present invention, when shifting to the retracted condition from the shooting condition, the part of the second lens group is inserted into the aperture of the light-amount adjusting member and the concave and convex surfaces, which are faced to each other, of the first and second lens groups are overlapped in the optical axis direction. Accordingly, the configuration is simplified and the barrel length under the retracted condition is shortened.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

A lens barrel of this embodiment is mounted on a digital camera as an image pickup apparatus. This lens barrel has a retractable zoom mechanism (a collapsible-mount-type zoom mechanism) with a variable focal length, increases a barrel length under a shooting condition, and decreases the barrel length under a retracted condition to retract the lens barrel into a camera body.

Figure 1:
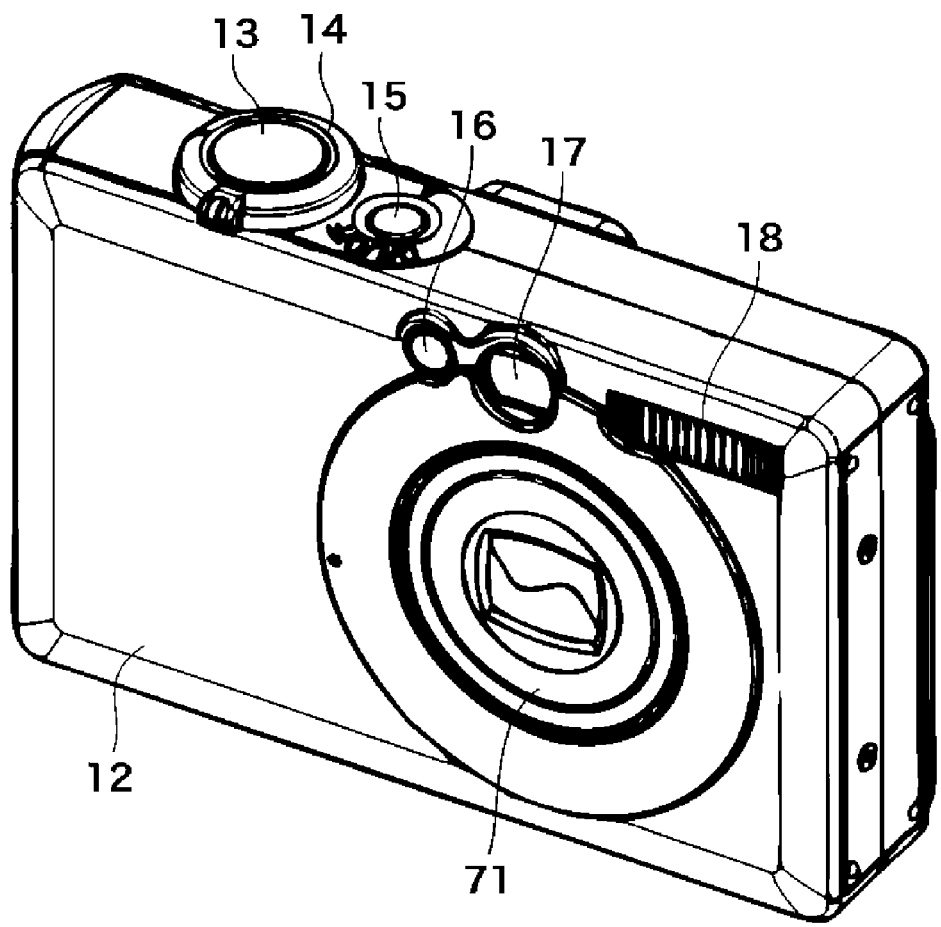
FIG. 1 is a perspective view showing an external appearance of a digital camera that is provided with a lens barrel according to an embodiment of the present invention.

FIG. 1 is a perspective view showing an external appearance of the digital camera 12 that is provided with the lens barrel 71 according to the embodiment. A finder 17 for determining composition of a subject, an auxiliary light source 16 for assisting photometric measurement and distance measurement, an electric flash 18, and the lens barrel 71 are mounted on a front side of the digital camera 12. It should be noted that FIG. 1 shows the condition where the main power of the digital camera 12 is OFF and the lens barrel (an image pickup lens barrel) 71 is under the retracted condition.

A release button 13, a power supply change button 15, and a zoom switch 14 are arranged on an upper surface of the digital camera 12. A tripod fitting part (not shown) and a card battery cover (not shown) are arranged on a bottom surface of the digital camera 12. A memory card drive 42 and a battery insert portion (not shown) that will be described later are arranged inside the card battery cover.

Operation buttons 21, 22, 23, 24, 25, and 26 that are used to switch various functions; a display 20 (see FIG. 2) that consists of LCD; and a finder eyepiece (not shown) are arranged on a back surface of the digital camera 12. An operation mode of the digital camera 12 is selected by depressing the manual operation buttons 21 through 26 from among a shooting mode, a reproduction mode, a moving image shooting mode, or the like. The display 20 displays image data stored in a memory 40 or image data read from a memory card. When the reproduction mode is selected, the display 20 displays a plurality of shooting data with a reduced size.

Figure 2:
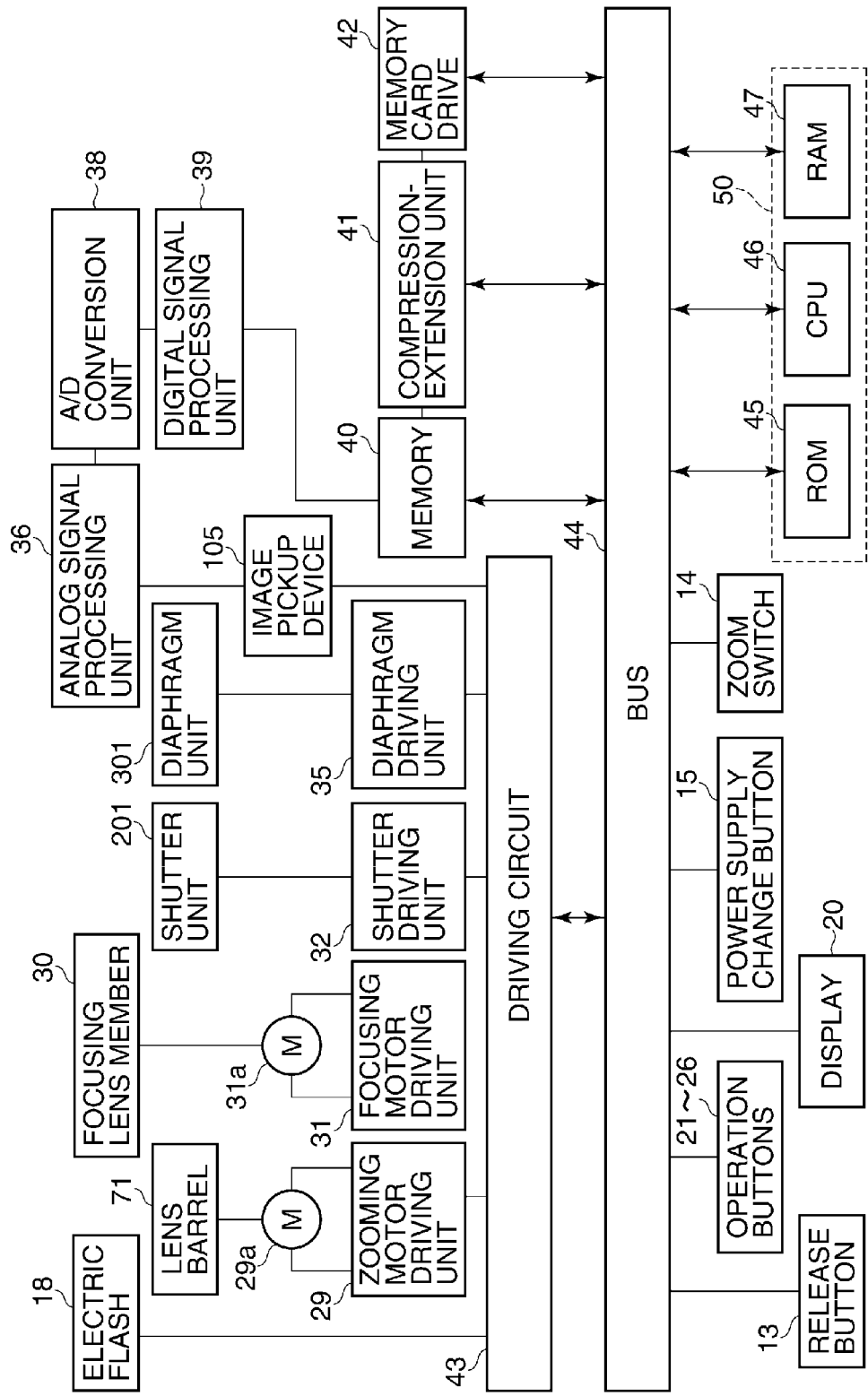
FIG. 2 is a block diagram schematically showing configurations of a control unit and peripheral circuits of the digital camera in FIG. 1.

FIG. 2 is a block diagram schematically showing configurations of a control unit and peripheral circuits of the digital camera 12. A control unit 50 mainly consists of a CPU 46, a ROM 45, and a RAM 47. The control unit 50 and various components such as the release button 13, the operation buttons 21 through 26, the display 20, the memory 40, and the memory card drive 42 are connected via a bus 44.

A zooming motor driving unit 29, a focusing motor driving unit 31, a shutter driving unit 32, a diaphragm driving unit 35, an image pickup device 105 such as a CCD and a CMOS, and the electric flash 18 are connected to a driving circuit 43 that is connected with the control unit 50 via the bus 44. The zoom motor driving unit 29 drives a lens-barrel driving motor 29a. The focusing motor driving unit 31 drives a focusing motor 31a. These units are controlled by signals from the control unit 50. Control programs to control the above-mentioned various constitution elements are stored in the ROM 45. Data required for the respective control programs is stored in the RAM 47.

In the digital camera 12 having the above-mentioned configuration, when a user presses the power supply change button 15 to turn the power ON from OFF, the CPU 46 reads a necessary control program from the ROM 45, and starts an initial operation. That is, the control unit 50 shifts the lens barrel 71 to a predetermined shooting condition, and starts a shooting function so that the camera is made into a shooting standby state.

When the user presses the release button 13 to take a picture, the control unit 50 detects brightness (a photometry value) of a subject by the image pickup device 105, sets an aperture value and a shutter speed based on the photometry value, and determines whether the electric flash 18 will be emitted or not. By operating the operation button 21 beforehand, the user can also select a flash mode from among a forced-emission mode to force the electric flash 18 to emit and a no-emission mode to prohibit an emission.

Next, the control unit 50 measures a distance to the subject, and controls the focusing motor driving unit 31 so as to move a focusing lens member 30 to a predetermined in-focus position. Accordingly, an image pickup lens focuses on the subject. It should be noted that a third lens group 104 mentioned later is used for the focusing lens member 30.

The control unit 50 controls the shutter driving unit 32 so as to open and close a shutter (the shutter unit) 201, and makes the image pickup device 105 capture a desired image. Electrical charge corresponding to a light amount that enters based on an exposure value is accumulated by the image pickup device 105. The electrical charge is converted into an image signal, which is outputted to an analog signal processing unit 36.

The analog signal processing unit 36 applies an analog signal process to the captured image signal, and outputs to an A/D conversion unit 38. The A/D conversion unit 38 converts the received analog data into digital data. The digital data is outputted to a digital signal processing unit 39, and the digital data is processed here. Finally, the digital data is stored into the memory 40.

A compression-extension unit 41 applies a compression process or the like such as JPEG and TIFF to the digital data stored in the memory 40 in response to an operation of the operation button 22. Then, the processed data is outputted to the memory card drive 42, and is stored into the memory card. It should be noted that the digital data processed by the digital signal processing unit 39 is outputted to the compression-extension unit 41 and is stored into the memory card by the memory card drive 42, when the digital camera 12 does not have a memory 40.

The control unit 50 controls the compression-extension unit 41 to apply an expansion process to the image data stored in the memory 40 or the image data stored in the memory card by the memory card drive 42, and displays the processed image data on the display 20 via the bus 44. When the user who looks at the data indicated on the display 20 determines that the image is unnecessary, the user can delete data by operating the operation button 23.

When the user operates the zoom switch 14 arranged on the upper surface of the digital camera 12, the zoom motor driving unit 29 is controlled by the control unit 50 through the driving circuit 43 so that the lens barrel 71 extends/contracts in an optical axis direction of an optical system (the direction of an optical axis passing through centers of lenses). The user can perform what is called digital zoom that enlarges or reduces a stored image displayed on the display 20 by operating the zoom switch 14.

Figure 3:
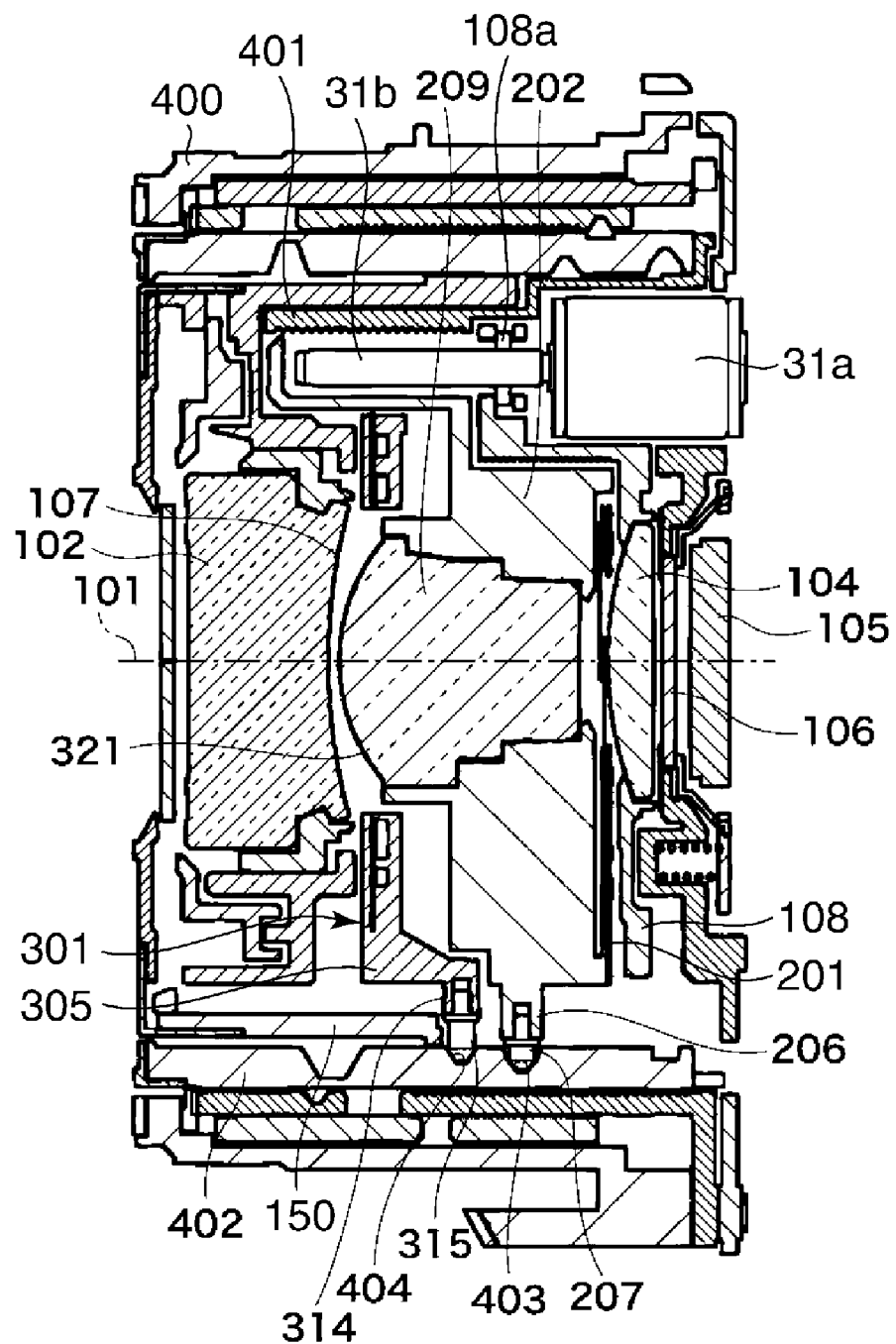
FIG. 3 is a sectional view showing a configuration of the lens barrel according to the embodiment under a retracted condition.
Figure 4:
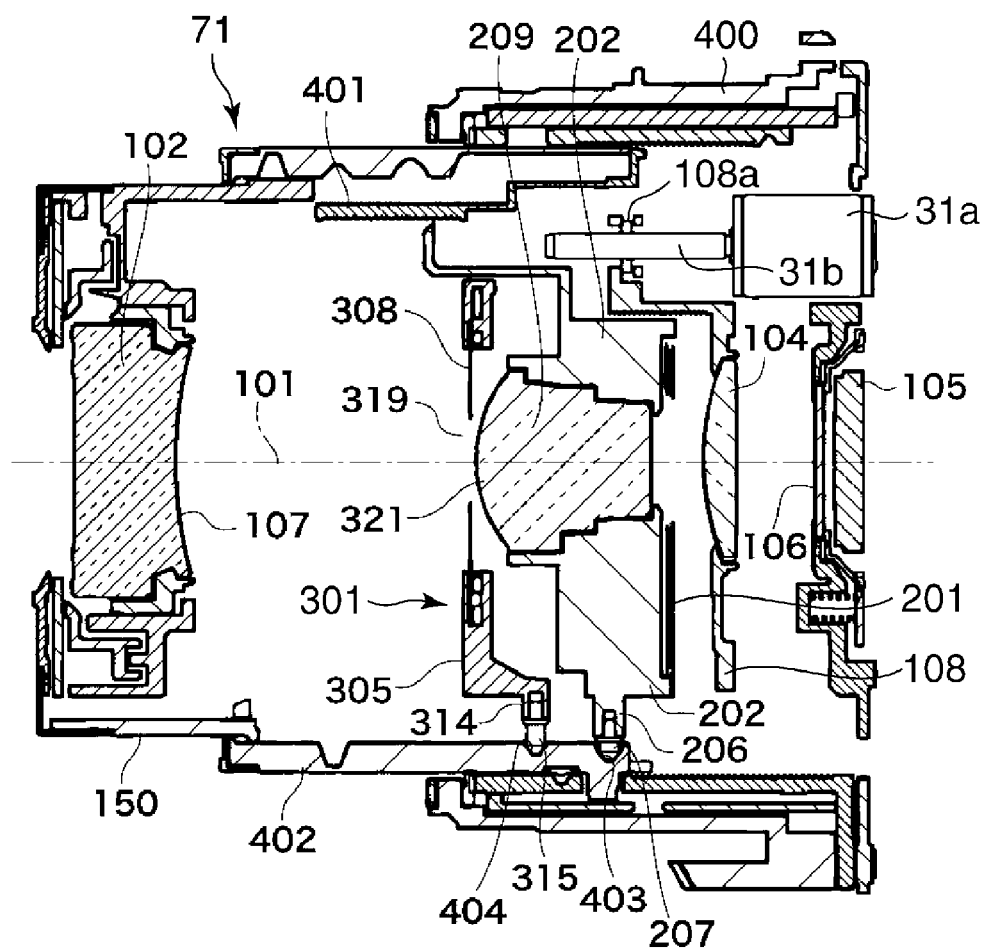
FIG. 4 is a sectional view showing the configuration of the lens barrel according to the embodiment under a shooting condition.

Next, a configuration of the lens barrel 71 the digital camera 12 will be described. FIG. 3 is a sectional view showing the configuration of the lens barrel 71 under the retracted condition. FIG. 4 is a sectional view showing the configuration of the lens barrel 71 under the shooting condition.

An optical system arranged in the lens barrel 71 is constituted by arranging a first lens group 102, a diaphragm unit 301, a second lens group 209, the shutter 201, the third lens group 104, a filter 106, and the image pickup device 105 along the optical axis 101 in this order from a subject side that is a left side in FIG. 3 and FIG. 4. It should be noted that although each of the lens groups is shown as a single-piece lens in the figures, it is constituted as a combination of a plurality of lenses in fact.

The lens barrel 71 is provided with a fixing barrel 400 that surrounds the outermost position, a rotating barrel 402 that is driven by the zoom motor 29a to be rotated inside the fixing barrel 400, a cylinder 150 that is inserted inside the rotating barrel 402 from the subject side, and a straight moving barrel 401 that is inserted inside the rotating barrel 402 from the side of the image pickup device 105. The rotating barrel 402 moves in the optical axis direction by rotating. Although the straight moving barrel 401 moves in the optical axis direction with the rotating barrel 402, it goes straight on without rotating.

The second lens group 209 is fixed to a shutter base 202 (a second holding frame). The shutter 201 is mounted on the shutter base 202. Three advance guide parts 206 are formed on the shutter base 202 radially at nearly regular intervals, and cam pins 207 are attached to tip ends thereof. The cam pins 207 are engaged with cam grooves 403 formed inside the rotating barrel 402. When the rotating barrel 402 rotates, the shutter base 202 moves in the optical axis direction.

The diaphragm unit 301 is located between the first and second lens groups 102 and 209 as a light-amount adjusting member that adjusts an amount of light that transmits the optical system by changing an aperture diameter, and is mounted on a diaphragm base 305 (a third holding frame). Three advance guide parts 314 are formed on the diaphragm base 305 radially at nearly regular intervals, and cam pins 315 are attached to tip ends thereof. The cam pins 315 are engaged with cam grooves 404 formed inside the rotating barrel 402. When the rotating barrel 402 rotates, the diaphragm base 305 moves in the optical axis direction.

The first lens group 102 is held by the cylinder 150 (a first holding frame) that is movable in the optical axis direction with respect to the rotating barrel 402. The cylinder 150 has follower parts that follow cam grooves (not shown) formed on the rotating barrel 402, and moves in the optical axis direction according to a rotation of the rotating barrel 402.

The third lens group 104 is held by a lens frame 108. The lens frame 108 equips a screw guide 108a at one edge thereof. The screw guide 108a is meshed with a worm gear 31b fixed to a rotating shaft of the focusing motor 31a. When rotating the focusing motor 31a, the third lens group 104 moves in the optical axis direction.

Figure 5:
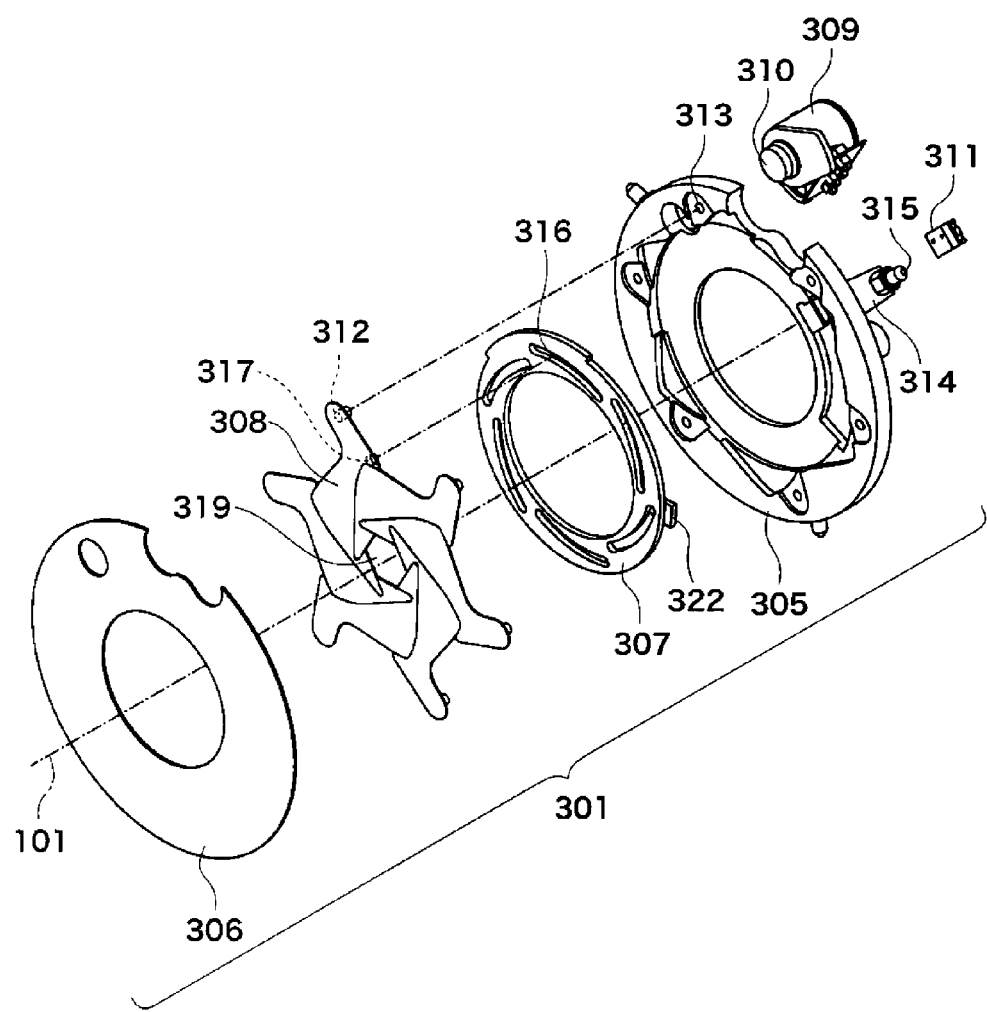
FIG. 5 is an exploded perspective view showing a configuration of a diaphragm unit of the lens barrel according to the embodiment.
Figure 6:
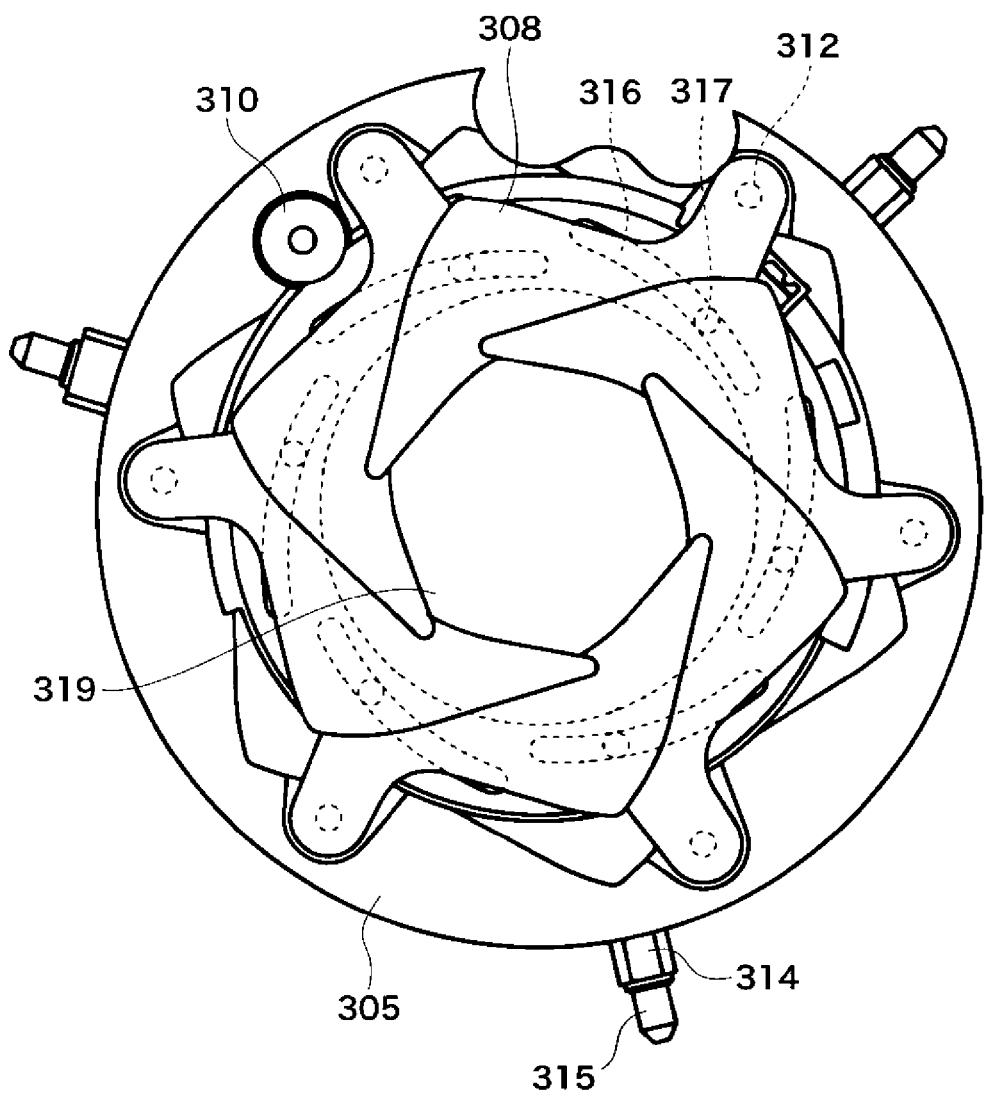
FIG. 6 is a view showing a configuration of the diaphragm unit of the lens barrel according to the embodiment viewed in an optical axis direction.
Figure 7:
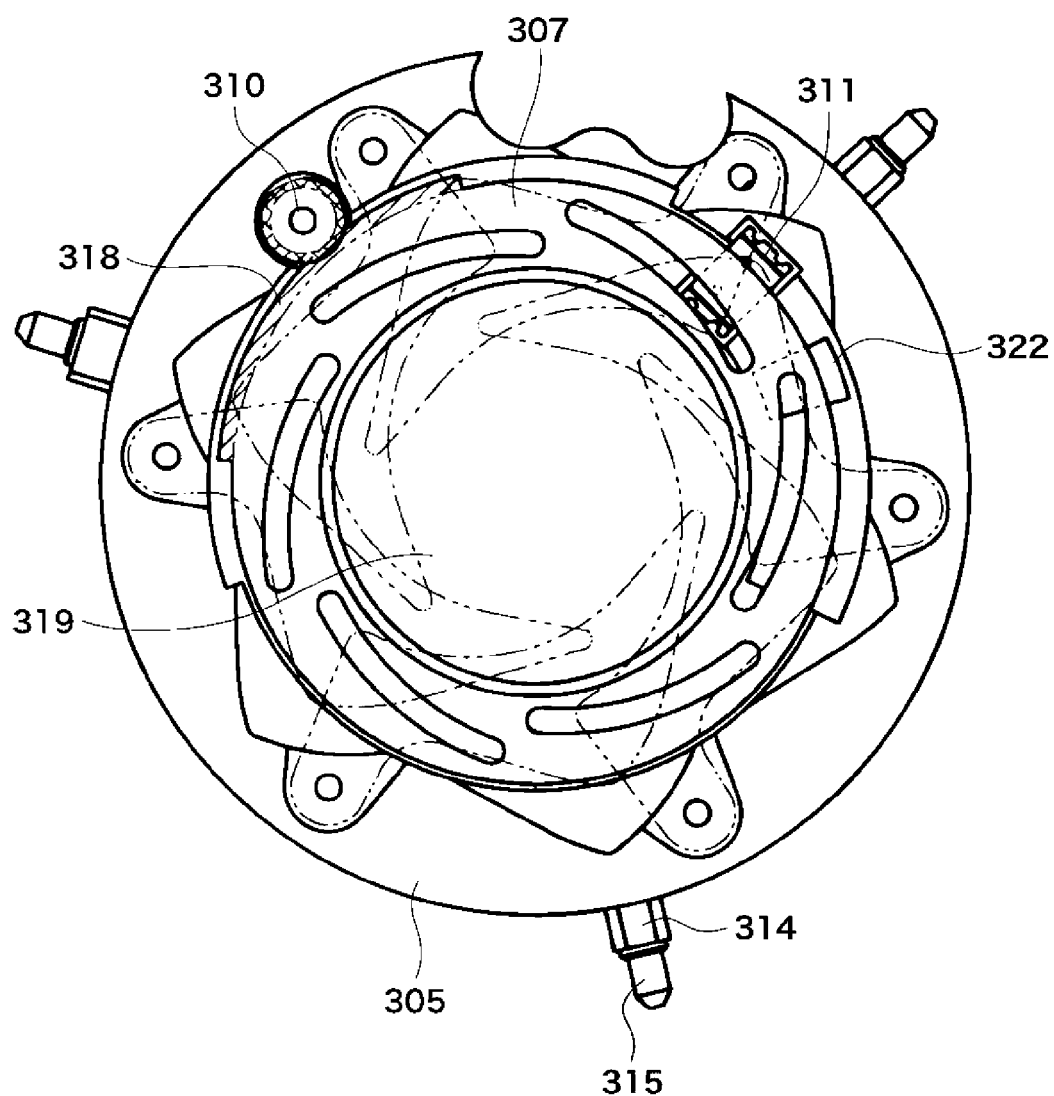
FIG. 7 is a view showing the configuration of the diaphragm unit of the lens barrel according to the embodiment viewed in an optical axis direction.
Figure 8:
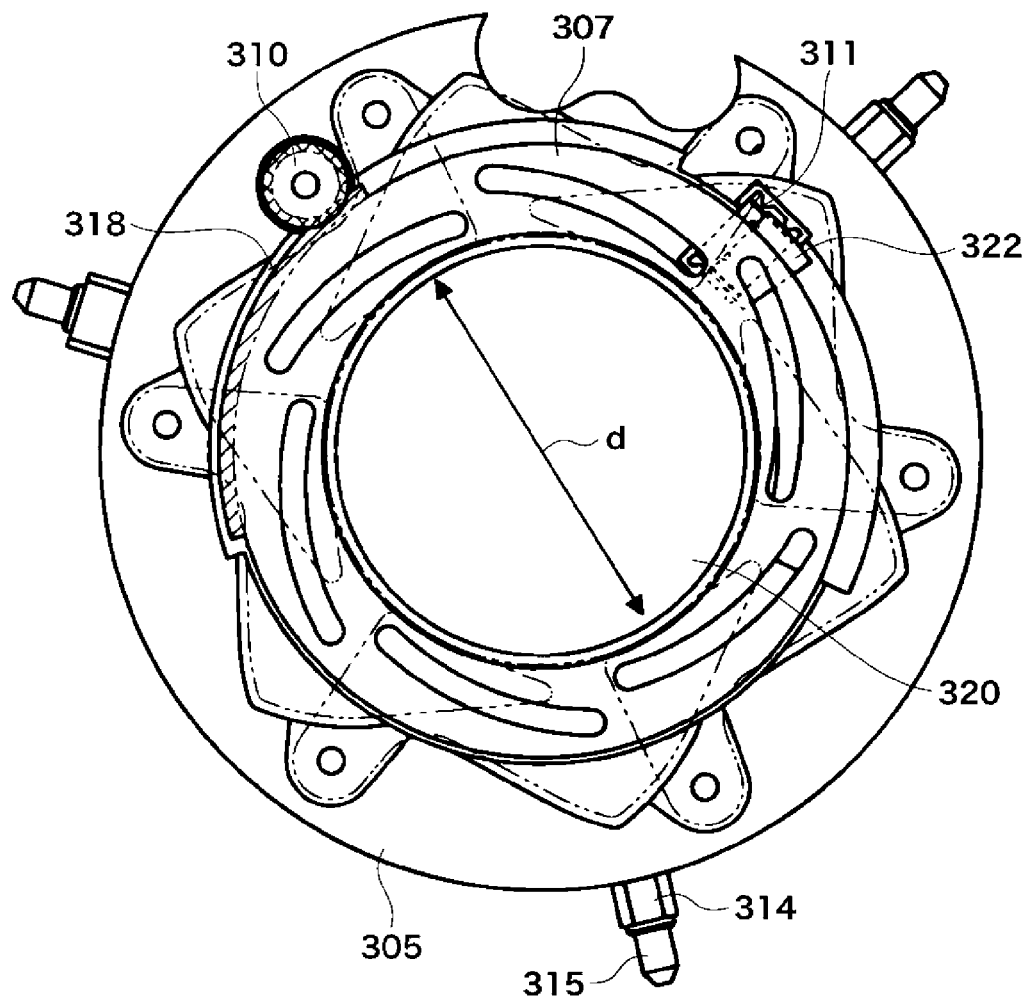
FIG. 8 is a view showing the configuration of the diaphragm unit of the lens barrel according to the embodiment viewed in an optical axis direction.

Next, a configuration of the diaphragm unit 301 will be shown. FIG. 5 is an exploded perspective view showing the configuration of the diaphragm unit 301. FIG. 6, FIG. 7, and FIG. 8 are views showing the configuration of the diaphragm unit 301 viewed in the optical axis direction.

The diaphragm unit 301 comprises the diaphragm base 305, a diaphragm cover 306, a diaphragm ring 307, diaphragm blades 308, a diaphragm actuator 309, a gear 310, and a sensor 311.

A plurality of holes 313 into which rotating shafts 312 of the diaphragm blades 308 are inserted are formed on the diaphragm base 305 at nearly regular intervals in the circumferential direction around the optical axis 101. The gear 310 is attached to the driving shaft of the diaphragm actuator 309. The diaphragm actuator 309 is fixed to the diaphragm base 305.

A plurality of cam grooves 316 with which bosses 317 of the diaphragm blade 308 are engaged are formed on the diaphragm ring 307 at nearly regular intervals in the circumferential direction around the optical axis 101. A gear part 318 that meshes with the gear 310 and a detected part 322 that is detected by the sensor 311 are formed on the diaphragm ring 37. It should be noted that the combination of the sensor 311 and the detected part 322 is an example of a position detecting unit.

The rotating shaft 312 and the boss 317 are formed on the diaphragm blade 308. The rotating shaft 312 is inserted into the hole 313 formed on the diaphragm base 305. The boss 317 is inserted into the cam groove 316 formed on the diaphragm ring 307.

The plurality of diaphragm blades 308 are arranged at the nearly regular intervals around the optical axis 101. The plurality of diaphragm blades 308 foam an aperture 319 of which a size is variable in response to an overlapping condition of the diaphragm blades 308.

When the diaphragm ring 307 is driven by the power of the diaphragm actuator 309, each of the diaphragm blades 308 moves so as to rotate along the cam groove 316 of the diaphragm ring 307 around the rotating shaft 312, and the aperture 319 of the diaphragm unit 301 will be set at a desired size.

Under the shooting condition, the diaphragm unit 301 of this embodiment adjusts the light amount by changing the size of the aperture 319 formed of diaphragm blade 308. On the other hand, under the retracted condition, the plurality of diaphragm blades 308 are stored in positions outer than the maximum aperture d and inner than the outer diameter of the diaphragm base 305 in order to prevent interference with the second lens group 209. That is, the plurality of diaphragm blades 308 shift to a super-full aperture condition where the aperture is opened still larger than the maximum aperture under the shooting condition. Here, the inner side of the maximum aperture d under the super-full aperture condition is defined as a super-full aperture 320.

The sensor 311 is fixed to the diaphragm base 305. The condition of the diaphragm blades 308 is grasped by detecting the position of the detected part 322 formed on the diaphragm ring 307. In this embodiment, the sensor 311 is arranged so as to detect the detected part 322 when the diaphragm blades 308 are stored in the diaphragm base 305 and shift to the super-full aperture condition where the aperture is opened still larger than the maximum aperture under the shooting condition.

Figure 9:
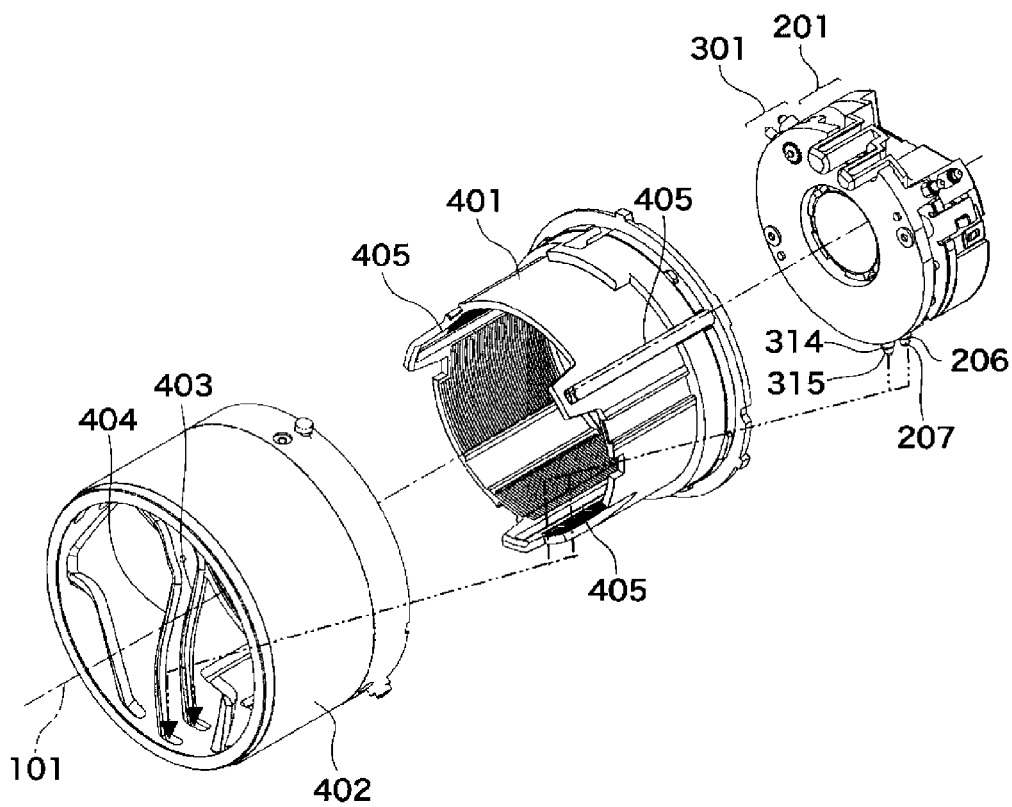
FIG. 9 is a view showing configurations of a straight moving barrel, a rotating barrel, the diaphragm unit, and a shutter unit of the lens barrel according to the embodiment.
Figure 10:
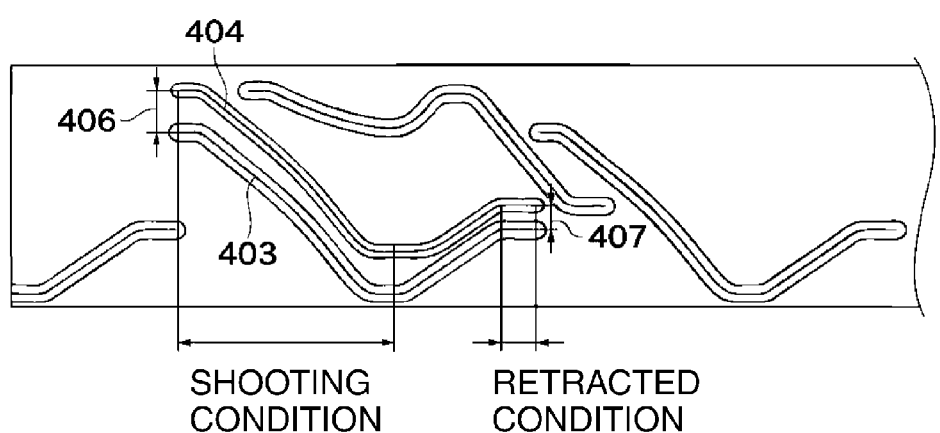
FIG. 10 is a development view showing cam grooves formed on the rotating barrel of the lens barrel according to the embodiment.

FIG. 9 is a view showing configurations of the straight moving barrel 401, the rotating barrel 402, the diaphragm unit 301, and the shutter unit 201. FIG. 10 is a development view showing the cam grooves 403 and 404 formed on the rotating barrel 402.

Slits 405 are formed on the straight moving barrel 401 so that the advance guide parts 206 provided on the shutter unit 201 (a light-amount varying member) and the advance guide parts 314 provided on the diaphragm unit 301 are fitted in the slits 405. It should be noted that a rotation of the straight moving barrel 401 is prohibited by a straight movement control member (not shown).

The rotating barrel 402 is rotatable and movable in the optical axis direction with respect to the straight moving barrel 401. As mentioned above, the cam grooves 403 with which the cam pins 207 provided at the tip end of the advance guide parts 206 are engaged, and the cam grooves 404 with which the cam pins 315 provided at the tip ends of the advance guide parts 314 are engaged are formed on the inner surface of the rotating barrel 402.

The advance guide parts 314 and 206 are inserted into the slits 405 of the straight moving barrel 401, and the cam pins 207 and 315 provided at the respective tip ends are located in the cam grooves 403 and 404 formed on the rotating barrel 402. Accordingly, the straight moving barrel 401 and the rotating barrel 402 hold the diaphragm unit 301 and the shutter unit 201.

Here, when rotating the rotating barrel 402 relatively to the straight moving barrel 401, the shutter unit 201 and the diaphragm unit 301 move in the direction of the optical axis 101. A distance between the shutter unit 201 and the diaphragm unit 301 is maintained at a fixed interval 406 under the shooting condition by means of the cam grooves 403 and 404 formed on the rotating barrel 402. However, since the interval between the cam groove 403 and the cam groove 404 decreases to an interval 407 when shifting to the retracted condition from the shooting condition, the shutter unit 201 and the diaphragm unit 301 become close to each other. Accordingly, the barrel length under the retracted condition can be reduced.

It should be noted that although the shutter unit 201 and the diaphragm unit 301 are moved while keeping the distance therebetween under the shooting condition in this embodiment, they can be moved while changing the distance, which increases a degree of freedom of the optical system. Since the shutter unit 201 and the diaphragm unit 301 are held and driven by the straight moving barrel 401 and the rotating barrel 402, the structure of the lens barrel is simplified.

Figure 11:
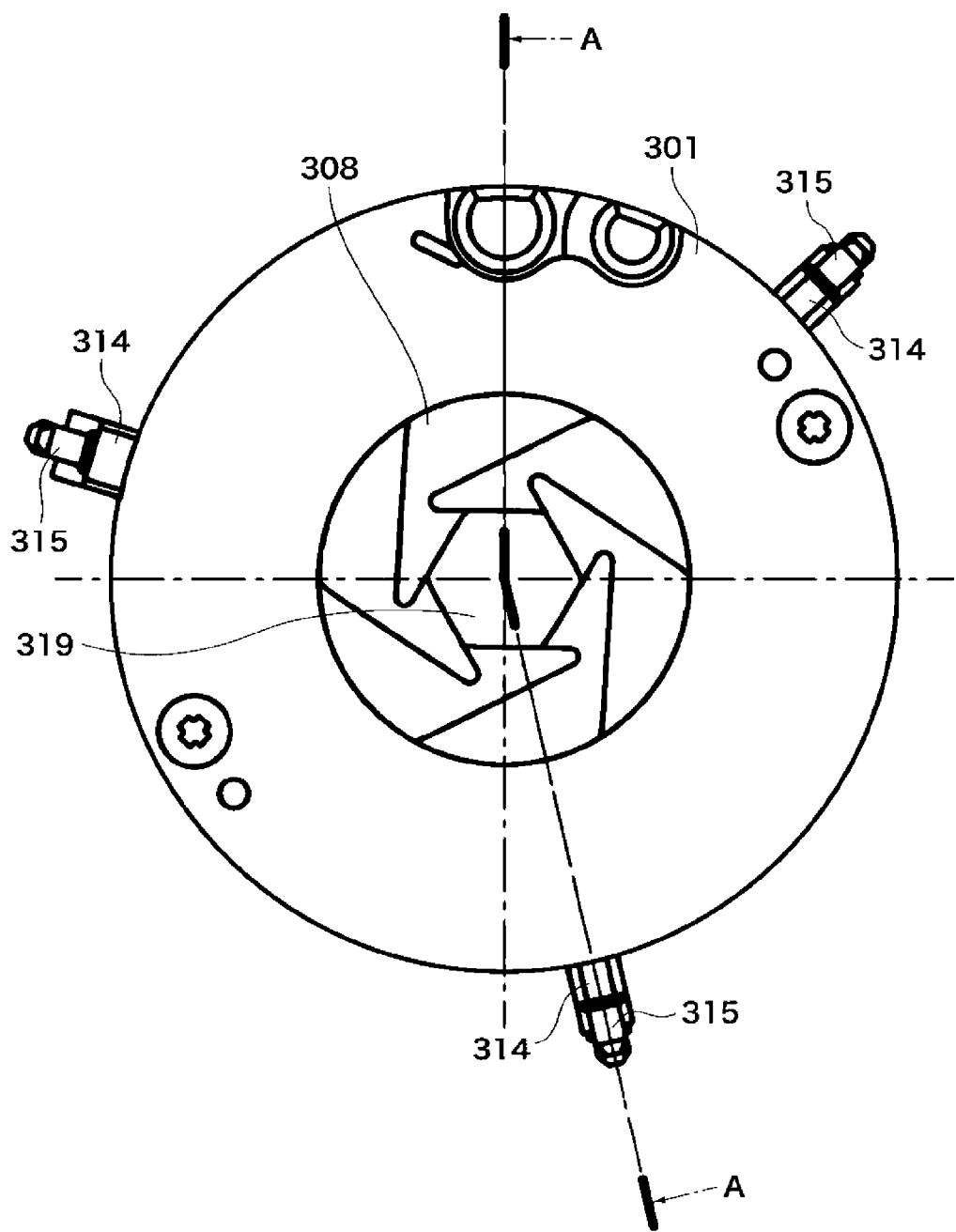
FIG. 11 is a view showing external appearances of the diaphragm unit and the shutter unit of the lens barrel according to the embodiment under the shooting condition viewed in an optical axis direction.
Figure 12:
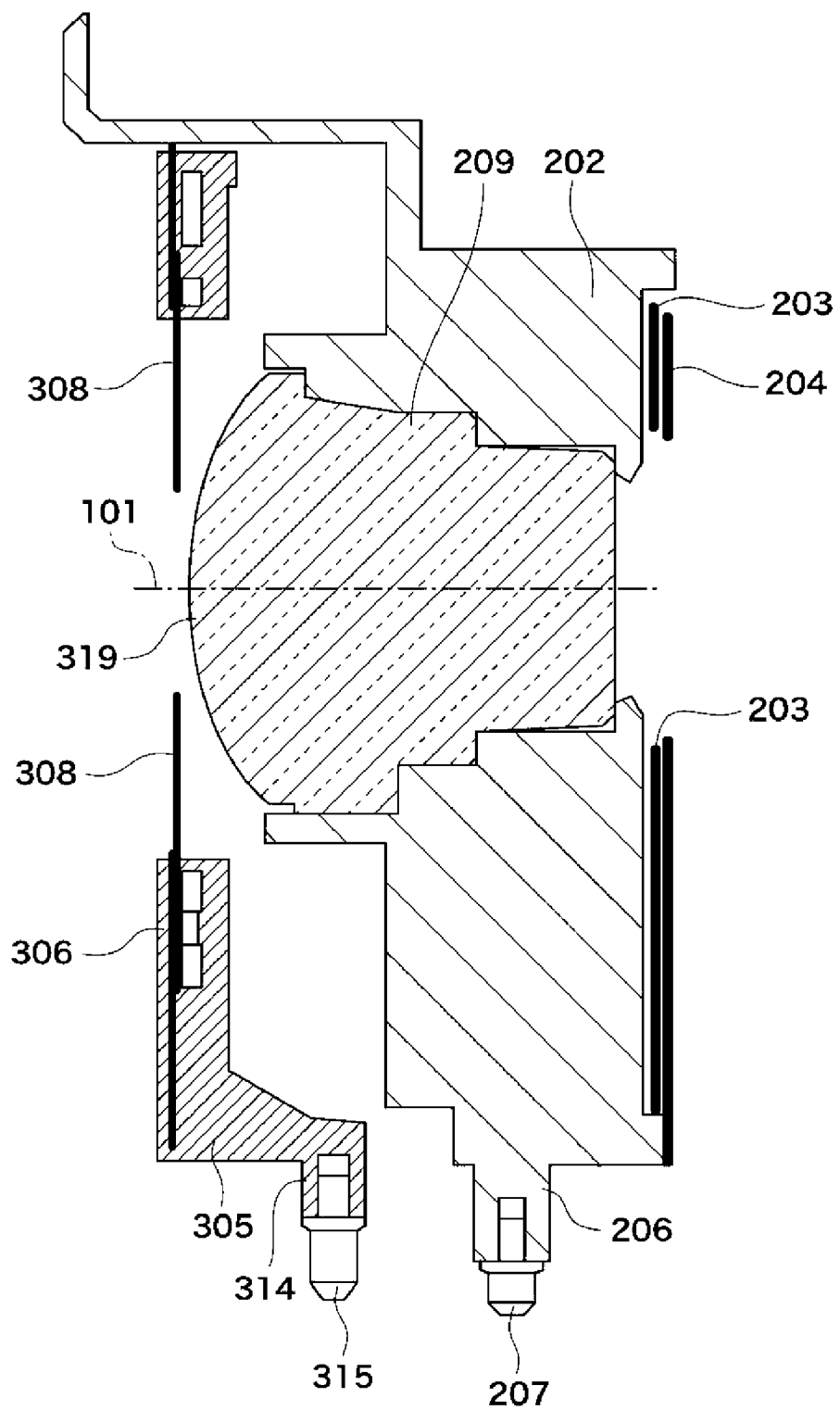
FIG. 12 is a sectional view showing structures of the diaphragm unit and the shutter unit viewed in a direction of an arrow A-A line in FIG. 11.

Next, the diaphragm unit 301 and the shutter unit 201 under the shooting condition and the retracted condition will be described. FIG. 11 is a view showing external appearances of the diaphragm unit 301 and the shutter unit 201 under the shooting condition viewed in the optical axis direction. FIG. 12 is a sectional view showing structures of the diaphragm unit 301 and the shutter unit 201 viewed in a direction of an arrow A-A line in FIG. 11.

Figure 13:
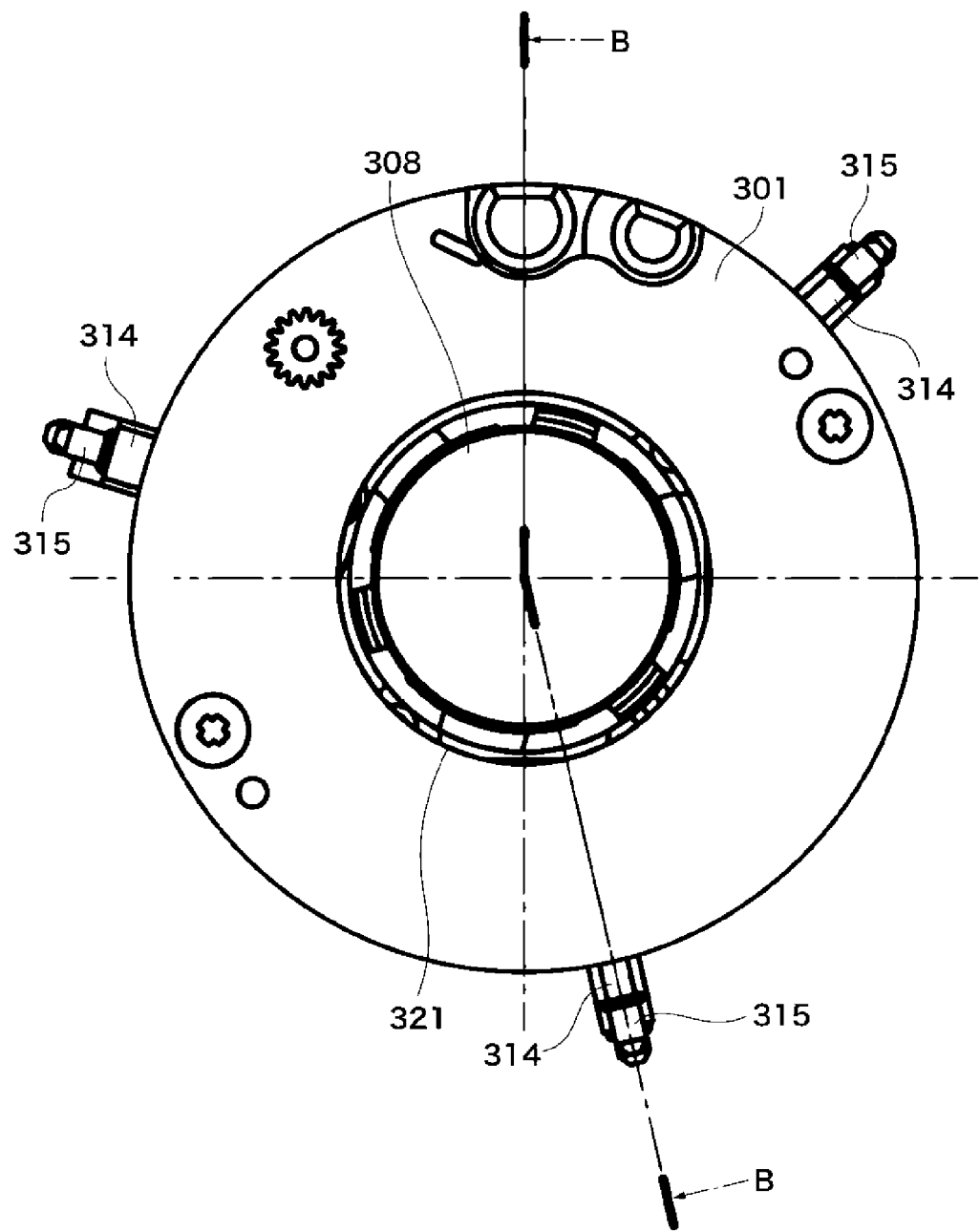
FIG. 13 is a view showing the external appearances of the diaphragm unit and the shutter unit of the lens barrel according to the embodiment under the retracted condition viewed in the optical axis direction.
Figure 14:
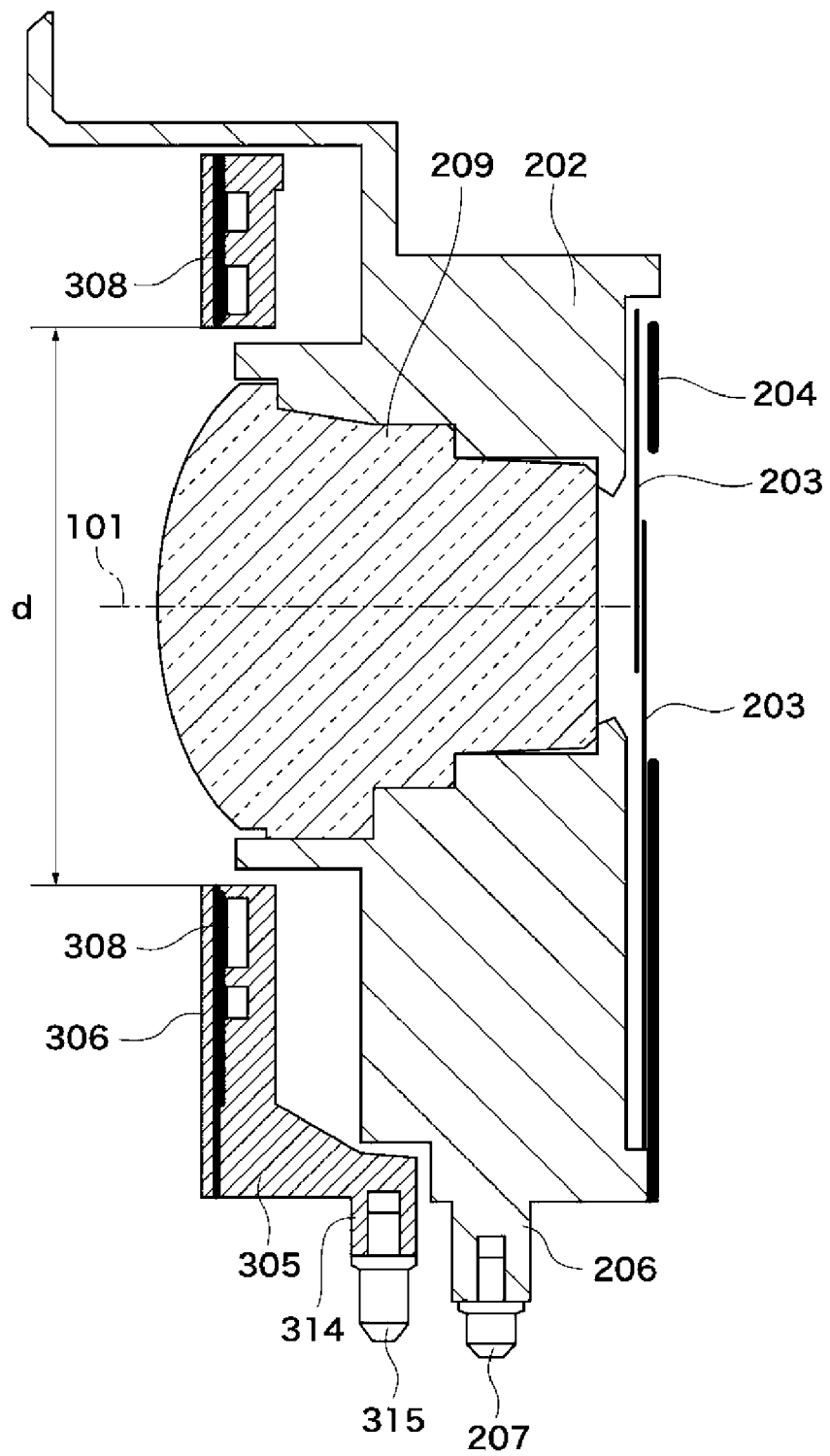
FIG. 14 is a sectional view showing structures of the diaphragm unit and the shutter unit viewed in a direction of an arrow B-B line in FIG. 13.

FIG. 13 is a view showing the external appearances of the diaphragm unit 301 and the shutter unit 201 under the retracted condition viewed in the optical axis direction. FIG. 14 is a sectional view showing structures of the diaphragm unit and the shutter unit viewed in a direction of an arrow B-B line in FIG. 13.

The shutter unit 201 and the diaphragm unit 301 are arranged independently so as to sandwich the second lens group 209 in the direction of the optical axis 101. The shutter unit 201 is arranged closer to the image pickup device 105 than the diaphragm unit 301.

The shutter unit 201 comprises a part of the shutter base 202, a shutter blade 203, a shutter cover 204 (see FIG. 12), and a shutter actuator (not shown). The shutter blade 203 consists of one or plural blades dependent on its space. The shutter blade 203 can be opened and closed using a power of the shutter actuator, and is held under a fully-opened condition or a totally closed condition in a no-electricity status.

Figure 15:
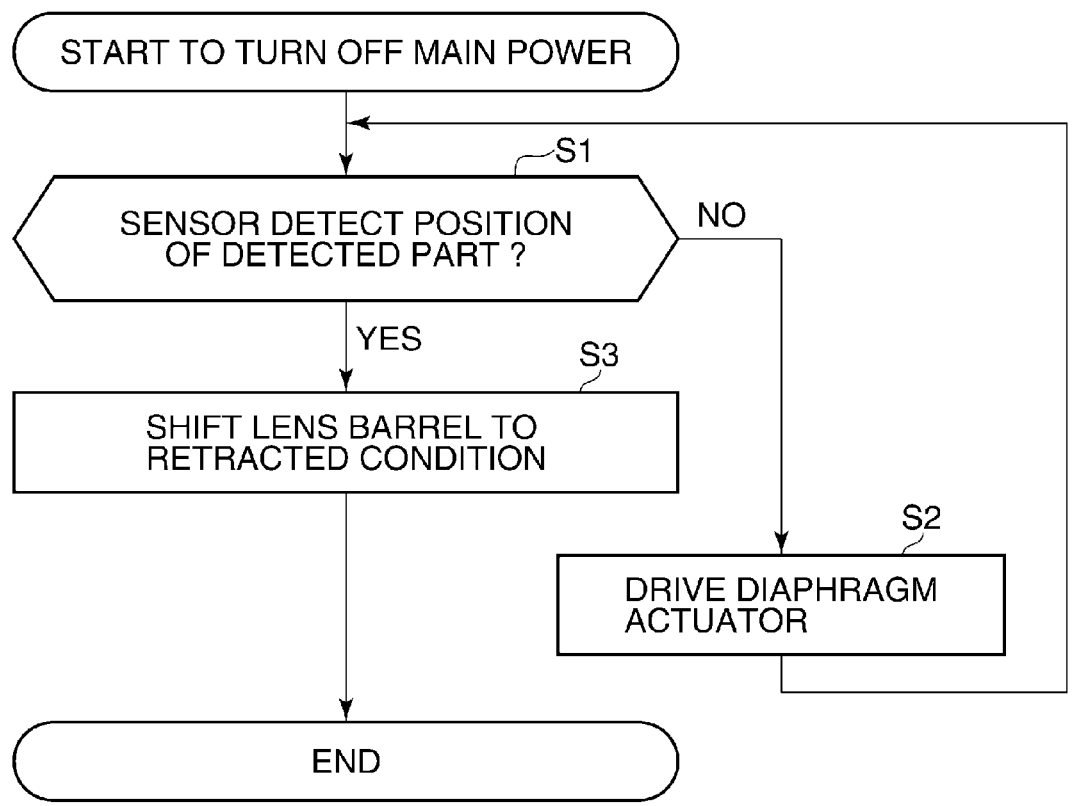
FIG. 15 is a flowchart showing operation procedures to shift the lens barrel to the retracted condition from the shooting condition when turning OFF a main power of the digital camera in FIG. 1.

FIG. 15 is a flowchart showing operation procedures to shift the lens barrel 71 to the retracted condition from the shooting condition when turning OFF the main power. This processing program is stored in the ROM 45 in the control unit 50, and is executed by the CPU 46 when the main power is turned OFF.

When the lens barrel 71 shifts to the retracted condition from the shooting condition, first, the control unit 50 determines whether the sensor 311 detects the position of the detected part 322 mounted on the diaphragm ring 307 (step S1). When the position of the detected part 322 is not detected, the control unit 50 checks the condition of the aperture 319 of the diaphragm blades 308, and drives the diaphragm actuator 309 according to the condition (step S2). And the control unit 50 returns the process to the step S1.

On the other hand, when the control unit 50 confirms that the diaphragm unit 301 is under the super-full aperture condition based on a signal from the sensor 311, the control unit 50 shifts the lens barrel 71 to the retracted condition from the shooting condition (step S3), and finishes this process.

At this time, the diaphragm. blades 308 are stored in positions outer than the super-full aperture 320 of the diaphragm unit 301, and shift to the super-full aperture condition where the aperture opens still larger than the maximum aperture under the shooting condition, and are held in order to prevent interference with the second lens group 209.

At least a part of the second lens group 209 enters into the super-full aperture 320 of the diaphragm unit 301, and at least a part of the second lens group 209 overlaps with at least a part of the first lens group 102 in the optical axis direction. That is, a convex surface 321 of the second lens group 209 enters into a recess portion of a concave surface 107 of the first lens group 102. Accordingly, the total length of the lens barrel can be reduced (see FIG. 3).

Figure 16:
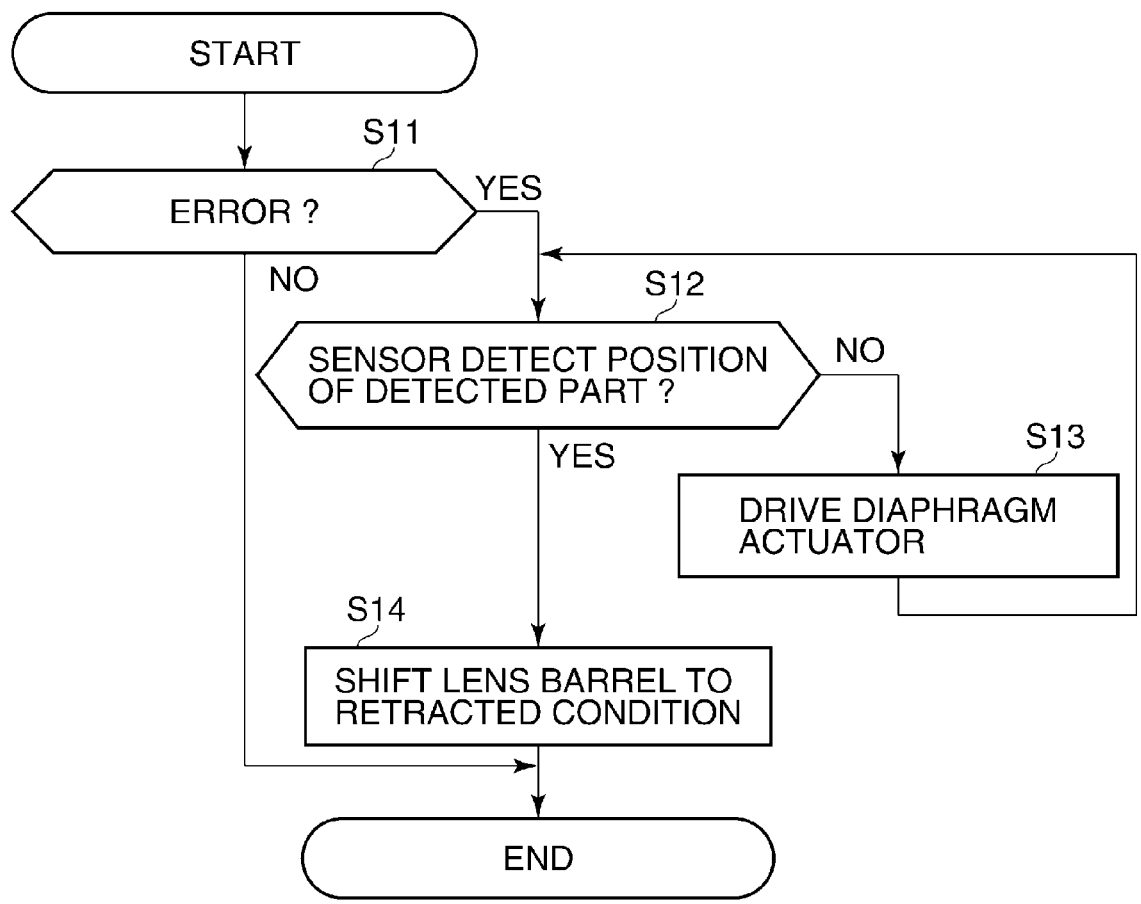
FIG. 16 is a flowchart showing operation procedures to shift the lens barrel to the retracted condition from the shooting condition when an error occurs under the shooting condition of the digital camera in FIG. 1.
Figure 17:
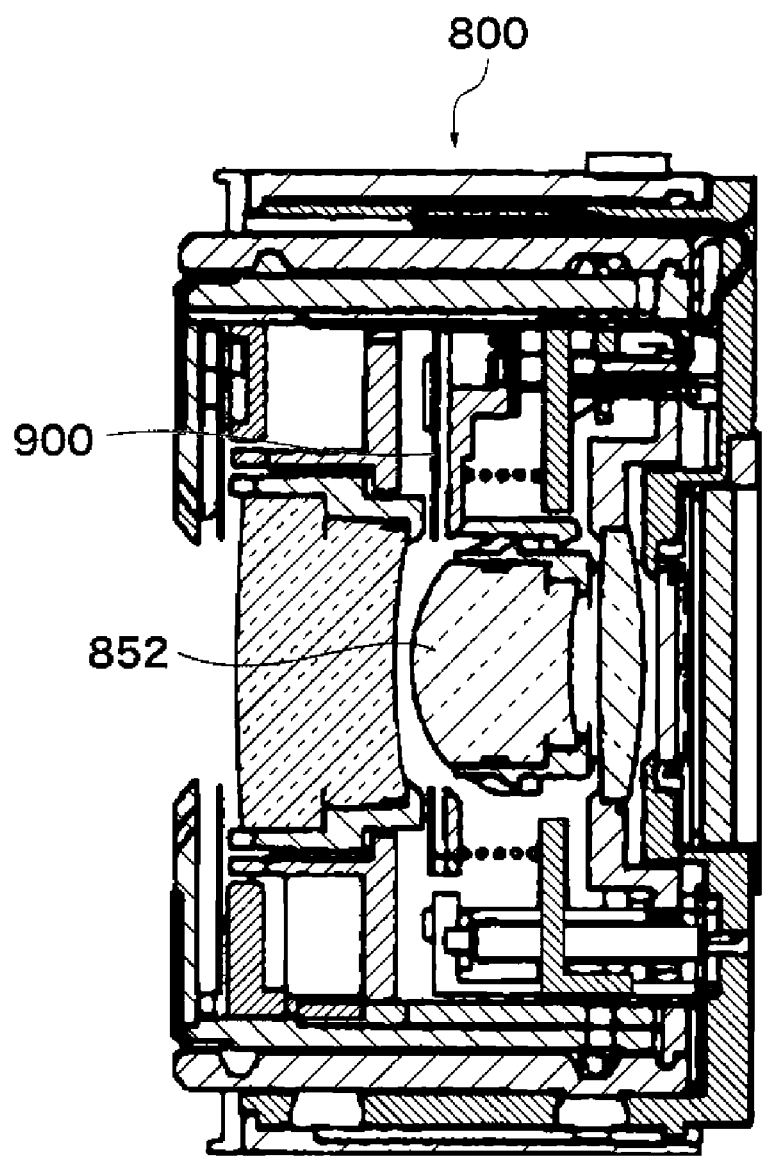
FIG. 17 is a sectional view showing a configuration of a conventional lens barrel.

FIG. 16 is a flowchart showing operation procedures to shift the lens barrel 71 to the retracted condition from the shooting condition when an error occurs under the shooting condition. This processing program is stored in the ROM 45 in the control unit 50, and is executed by the CPU 46 in a predetermined cycle.

The control unit 50 determines whether an error such as an abnormality of the digital camera 12 and a malfunction of the lens barrel 71 is occurred under the shooting condition (step S11).

When an abnormality occurs in the digital camera 12 or when the lens barrel 71 causes a malfunction under the shooting condition, the control unit 50 checks the condition of the diaphragm unit 301 based on a signal from the sensor 311 (step S12). That is, the control unit 50 determines whether the sensor 311 detects the position of the detected part 322 mounted on the diaphragm ring 307.

When the control unit 50 determines that the diaphragm blades 308 are not under the super-full aperture condition as a result of checking the aperture 319 of the diaphragm blades 308, the control unit 50 drives the diaphragm actuator 309 (step S13). And the control unit 50 returns the process to the step S12. On the other hand, when the control unit 50 confirms that the diaphragm unit 301 is under the desired super-full aperture condition based on the signal from the sensor 311, the control unit 50 shifts the lens barrel 71 to the retracted condition from the shooting condition (step S14), and finishes this process.

Thus, the control unit 50 shifts the diaphragm blade 308 to the super-full aperture condition by checking the condition of the diaphragm unit 301 based on the signal from the sensor 311. Accordingly, a damage of the lens barrel 71 due to interference between the diaphragm blades 308 and the second lens group 209, which occurs when the lens barrel 71 is retracted while keeping the diaphragm blades 308 under the shooting condition, is prevented.

Here, even when the lens barrel 71 is under the retracted condition, the shutter blade 203 can open and close regardless of the condition. Therefore, performance degradation of the image pickup device 105 and the filter 106 attached to the image pickup device 105 can be prevented by closing the shutter blade 203 under the retracted condition.

In this embodiment, the lens surface 107 of the first lens group 102 nearest to the second lens group 209 has a concave form, and the lens surface 321 of the second lens group 209 nearest to the first lens group 102 has a convex form. Under the retracted condition, these lens surfaces are overlapped in the direction of the optical axis 101. Accordingly, the barrel length under the retracted condition can be reduced. It should be noted that the combination of the surface forms is arbitrary and is not limited in particular.

Since the distance between the shutter unit 201 and the diaphragm unit 301 is not reduced when receiving an external force such as a shock under the shooting condition, damage to the shutter unit 201 and the diaphragm unit 301 can be prevented.

In the lens barrel of this embodiment, when shifting to the retracted condition from the shooting condition, the second lens group 209 enters into the super-full aperture 320 of the diaphragm unit 301, and the second lens group 209 and the first lens group 102 are held so that they are overlapped in the optical axis direction. Accordingly, the configuration is simplified and the barrel length under the retracted condition can be reduced.

Under the super-full aperture condition, since the second lens group 209 is held while being entered into the super-full aperture 320 of the diaphragm unit 301, damage to the diaphragm unit 301 can be prevented.

Since the lens barrel shifts to the retracted condition after checking that the diaphragm blades 308 are in the super-full aperture condition, contact between the lens and the blades can be prevented.

Since the shutter unit 201 is totally closed under the retracted condition, degradation of the image pickup device 105 can be prevented.

Since the shutter unit 201 does not approach the diaphragm unit 301 when receiving an external force such as a shock under the shooting condition, damage to the diaphragm unit 301 due to contact between the lens and the blades can be prevented.

Since the shutter unit 201 is arranged at the opposite side of the diaphragm unit 301 across the second lens group 209, the shutter unit 201 can be arranged near the image pickup device 105.

It should be noted that the present invention is applicable to not only the configuration of the above-mentioned embodiment, but also any configurations as long as the functions shown in the claims or the functions of the configuration of the embodiment can be achieved.

Although the diaphragm unit 301 becomes the super-full aperture condition and the shutter unit 201 becomes the totally closed condition in this embodiment, such conditions are not limited in particular. For example, a configuration where the shutter unit 201 fully opens as the light-amount adjusting member and the diaphragm unit 301 totally closes as the light-amount varying member, and a configuration where the light-amount adjusting member such as an ND filter is used instead of the diaphragm unit 301 may be adopted.

The configurations or allocations of the guide part, the pressurization part, etc. are not limited to those of the above-mentioned embodiment, and can be changed suitably.

Although the lens barrel of this embodiment is constituted as a single-piece design with the image pickup apparatus, it may be exchageably equipped with the image pickup apparatus.

In the above-mentioned embodiment, although the digital camera has been described as an example of the image pickup apparatus, the present invention is also applicable to a digital video camera etc.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-147579, filed on Jun. 22, 2009, which is hereby incorporated by reference herein in its entirety.

What is claimed is:

1. An image pickup apparatus comprising:
a lens barrel adapted to change a focal length by moving at least one of a first lens group and a second lens group in an optical axis direction, to increase a barrel length under a shooting condition, and to decrease the barrel length under a retracted condition, comprising:
a first holding frame adapted to hold the first lens group;
a second holding frame adapted to hold the second lens group;
a light-amount adjusting member adapted to adjust an amount of light that transmits an optical system by changing a diameter of an aperture, said light-amount adjusting member being located between said first lens group and said second lens group;

a third holding frame adapted to hold said light-amount adjusting member; and a cam mechanism adapted to move said first, second, and third holding frames in the optical axis direction so that a part of the second lens group is inserted into the aperture of said light-amount adjusting member and concave and convex surfaces, which are faced to each other, of the first and second lens groups are overlapped in the optical axis direction under the retracted condition, a control unit adapted to control said light-amount adjusting member to a super-full aperture condition so as to enlarge the diameter of the aperture up to the maximum diameter under the shooting condition and to control said cam mechanism so as to move said first, second, and third holding frames in the optical axis direction, when said lens barrel shifting to the retracted condition from the shooting condition.

2. The image pickup apparatus according to claim 1, wherein said light-amount adjusting member has a plurality of blades that vary the diameter of the aperture, and a position detection sensor that detects positions of the blades under the super-full aperture condition, and wherein said control unit allows said lens barrel to shift to the retracted condition, when the positions of the blades under the super-full aperture condition are detected by the position detection sensor.

* * * * *